April 9, 1935.  E. M. LONG  1,996,872
ANIMAL TRAP
Filed April 14, 1934   2 Sheets-Sheet 1
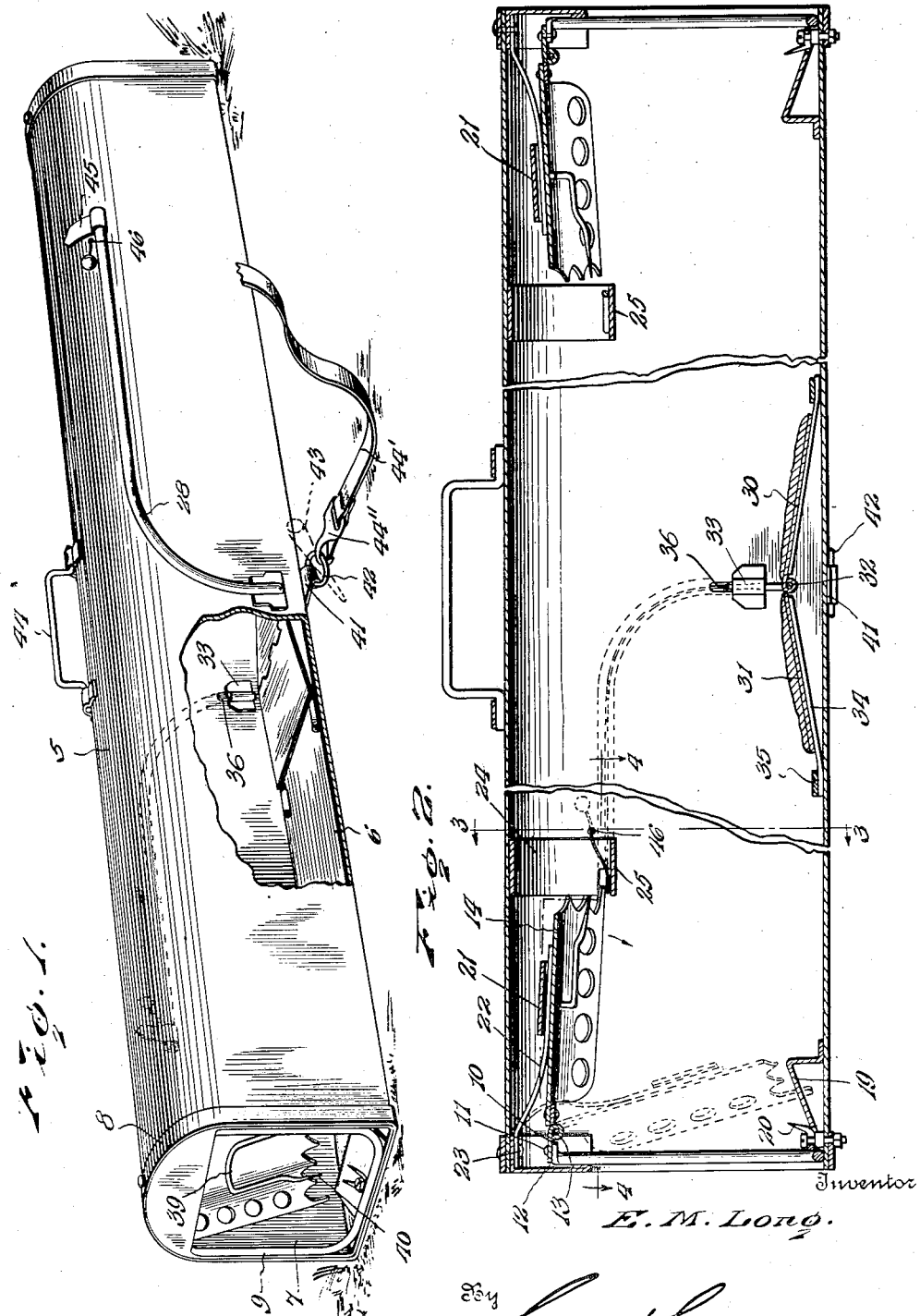

April 9, 1935.  E. M. LONG  1,996,872
ANIMAL TRAP
Filed April 14, 1934   2 Sheets-Sheet 2
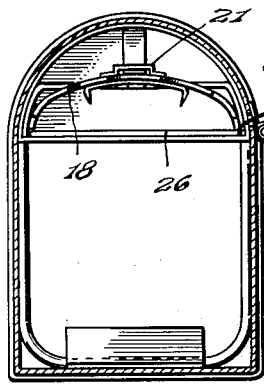
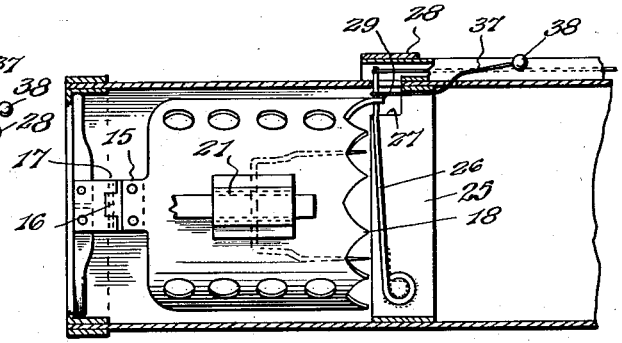
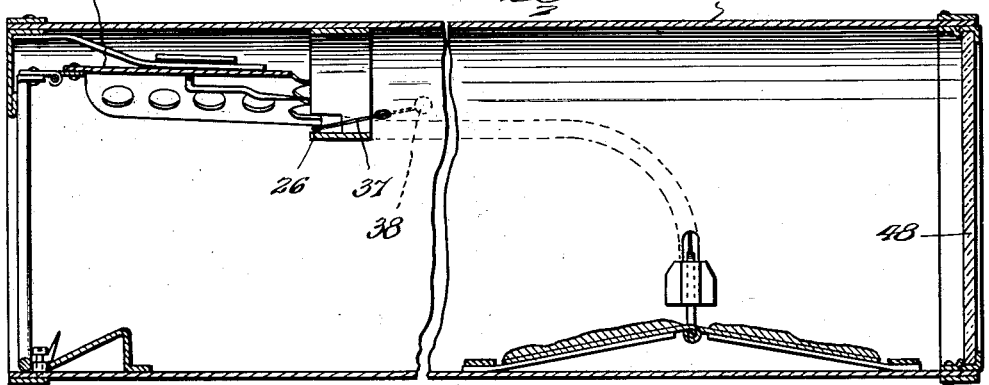
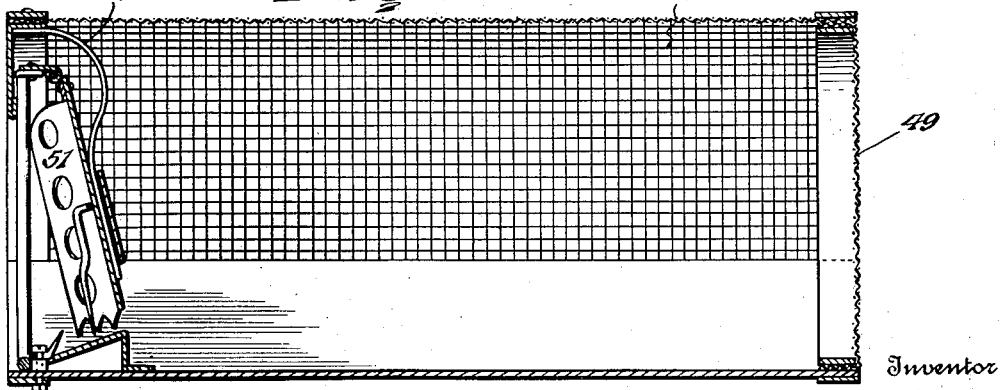
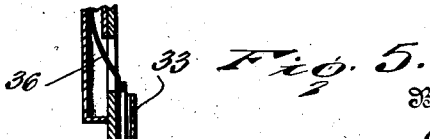

Patented Apr. 9, 1935

1,996,872

UNITED STATES PATENT OFFICE 1,996,872

ANIMAL TRAP

Edwin M. Long, Cadiz, Ohio

Application April 14, 1934, Serial No. 720,638

10 Claims. (Cl. 43—61)

This invention relates to animal traps and has for its object to provide an inexpensive, durable and thoroughly efficient device of this character which is humane in operation in that it will trap or catch any kind of animal and hold it captive without killing, or in any manner injuring, the animal.

A further object of the invention is to provide a trap which is simple in construction and positive in action and from which a captive animal cannot escape after having once entered the trap until, or unless, voluntarily released by the owner or attendant.

A further object is to provide a trap, the construction of which is such that a captive animal may be used as a bait for enticing other animals within the trap, especially during the mating season, so that a large number of animals may be caught without the necessity of constantly resetting the trap.

A further object is to provide the opposite ends of the trap with spring-actuated doors normally held in open or partially open position by a novel form of trigger mechanism which is operatively connected with a depressible treadle located within the trap between said doors whereby, when an animal enters the trap from either end thereof, the weight of the animal will actuate the treadle to release the trigger mechanism and automatically close the door and prevent escape of the animal.

A further object is to provide means for anchoring the trap either to the ground or to a suitable float in a river or other body of water so as to permit use of the device for trapping wild fowls and marine animals as well as fur-bearing animals.

A still further object of the invention is generally to improve this class of devices so as to increase their utility, durability and efficiency.

Similar numerals of reference indicate corresponding parts in all the figures of the drawings.

Figure 1 is a perspective view of an animal trap embodying the invention and showing the same anchored in position on the ground.

Figure 2 is a vertical longitudinal sectional view.

Figure 3 is a transverse sectional view taken on the line 3—3 of Figure 2.

Figure 4 is a horizontal sectional view taken on the line 4—4 of Figure 2.

Figure 5 is a detail sectional view showing the manner of connecting the flexible cable with the treadle.

Figure 6 is a vertical sectional view illustrating a modified form of the invention.

Figure 7 is a similar view illustrating a further modification.

The improved animal trap, forming the subject-matter of the present invention, comprises an elongated body portion or receptacle 5 preferably formed of sheet metal although, if desired, the receptacle may be constructed of heavy wire netting or other suitable material. The body portion 5 is preferably curved transversely at its top and is formed with a flat bottom 6, said receptacle having an entrance opening 7 at each end thereof, as shown. Secured to the opposite ends of the receptacle 5 are end frames 8 which may be soldered, riveted or otherwise secured to the walls of the receptacle and each frame 8 is preferably reinforced and strengthened by an auxiliary frame 9 constructed of heavy wire and having its upper portion flattened to form a supporting ledge 10 to which is riveted or otherwise secured at 11 to a plate 12 having a terminal eye 13. Disposed at each end of the trap is a swinging door or closure 14 of the construction best shown in Figure 4 of the drawings, said doors being provided with reduced necks 15 terminating in pintle eyes 16 which register with the eyes 13 to permit the passage of a pintle pin 17, thereby to permit the doors to swing freely to open or closed position. The lower edges of the doors are preferably scalloped to form teeth 18 which coact with an inclined or wedge-shaped plate 19 secured to the bottom of the trap at each entrance opening and serve to prevent an animal from forcing its way out through the adjacent opening when the door is closed. To further assist in preventing the escape of a captive animal from the trap, the inclined surface of each plate 19 is preferably provided with one or more upstanding spurs 20. Secured to the inner face of each door is a hollow guide 21 which slidably receives the adjacent end of a flat spring 22, the inner end of which is riveted or otherwise rigidly secured at 23 to the adjacent end frame 8 of the receptacle, the tendency of the spring being to normally force the door downwardly to closed position. Disposed within the trap, in spaced relation to each door opening, is a hollow arcuate brace 24 and secured to and supported on the transverse member 25 of each brace is one end of a trigger 26, the opposite end of which extends across a cut-away portion 27 in the member 25 and into a conduit 28 secured in any suitable manner to the exterior wall of the trap. One of the teeth 18 of each door is preferably longer than the others, as indicated at 29 and is adapted to rest on the trigger 26 so as to hold the doors open when the trap is in set position.

Disposed at the center of the trap is a depressible trip or trigger, preferably formed of two sections 30 and 31 having their adjacent ends pivotally united by a transverse rod 32, the opposite ends of which project upwardly within guides 33 secured in any suitable manner to the inner walls of the trap. The sections 30 and 31 of the treadle are secured to leaf springs 34, the ends of which are slidably mounted in loops or keepers 35 secured to the bottom of the receptacle 5 so that after the sections 30 and 31 are depressed by the weight of an animal, the spring 34 will return the sections to elevated or operative position. Secured to the upstanding end of each pin 32 is one end of a flexible cable 36, the opposite end of which extends through the adjacent tube or conduit 28 and is fastened in any suitable manner to the end of the adjacent trigger 26 so that, when the treadle is depressed, the triggers 26 will be moved laterally and thus release the doors and permit them to automatically move to closed position. Secured to the free end of each trigger is an operating rod or wire 37 terminating in a ball or finger piece 38 so that by exerting a longitudinal pull on the finger piece 38, the triggers may be moved laterally to permit the adjacent door to be swung upwardly and clear the trigger. When the pull on the finger piece 38 is released, the trigger will automatically engage the long tooth 29 on the door and hold the door in open position. The outer surface of each door is preferably provided with a substantially U-shaped member 39 having terminal spurs 40 which coact with the teeth 13 on the door to assist in preventing an animal from attempting to crawl under the door in an effort to escape from the trap.

The trap may be secured either to the ground or to a float in a river or other body of water, and in order to prevent displacement of the trap, the bottom thereof is provided with a transverse bar 41 having terminal loops 42 pivotally connected therewith and adapted to receive spikes or pegs 43 which may be driven into the ground or into the surface of the float to securely anchor the trap in position. The trap is also preferably provided with a suitable handle 44, by means of which the trap may be conveniently carried from place to place. The trap is also preferably provided with a shoulder strap 44' having terminal snap fasteners 44'' adapted to detachably engage the loops 42 to assist in carrying the trap. The ends of the tube or conduit preferably fit within clips 45 secured to the exterior of the trap and openings 46 are formed in the trap adjacent said clips to permit the passage of the trigger-release rods 37.

In operation, the doors are swung upwardly to open position against the tension of the springs 22 and in which position they are held in engagement with the triggers 26, as best shown in Figure 2 of the drawings. If desired, a suitable bait may be placed within the trap adjacent the treadle and should an animal enter the trap from either end thereof in an attempt to get at the bait, the weight of the animal will depress the treadle thereby exerting a pull on the operating cables 36 and releasing the triggers 26 so that the doors will move downwardly under the influence of the springs 27 to closed position and thus hold the animal captive. It will here be noted that the capture of the animal is effected without killing or in any manner injuring the animal, thereby rendering the trap humane in operation. The doors, when in closed position, cannot swing outwardly but may be swung inwardly against the tension of the springs 22, therefore, should an animal be trapped within the cage, additional animals may be caught without resetting the trap as they will be attracted to the captive animal, particularly in the mating season, and in an effort to reach the captive animal, they will press inwardly on the doors which will rise sufficiently to allow the animals to enter but will automatically close as soon as they pass the doors thereby holding all of the animals within the cage. When it is desired to reset the trap, it is merely necessary to exert a longitudinal pull on the finger piece 38 of the rod 37 and swing the doors upwardly, when, by releasing the finger piece 38, the trigger 26 will engage the long tooth 29 of the adjacent door and hold said door in open position and the trap in condition to receive other animals.

In Figure 6 of the drawings, there is illustrated a modified form of the invention in which the body portion or receptacle 5 is made somewhat shorter than the receptacle shown in Figure 1 of the drawings. In this case only one end of the receptacle is open and controlled by a door 47, the other end of the trap being preferably closed by a plate glass mirror 48 so that an animal approaching the trap will see his reflection in the mirror and thus think that other animals are already in the trap and that it is perfectly safe to enter the same. If desired, however, instead of employing a mirror as a closure for one end of the trap, said closure may be formed of transparent or translucent glass or, if desired, mesh wire.

A further modification of the invention is illustrated in Figure 7 of the drawings in which the body or receptacle of the trap, as well as the end wall 49 thereof, is formed of heavy wire mesh material indicated at 50. In this form of the device, the depressible treadle and trigger mechanism is dispensed with, the door 51 being normally and yieldably held in closed position by a leaf spring 52. If an animal attempts to effect an entrance to this form of trap, it will press inwardly against the door 51 thereby swinging the door inwardly and upwardly and permitting the animal to enter. As soon as the animal has cleared the door, however, the latter will automatically swing downwardly to closed position and the teeth or serrations on the bottom of the door will prevent the animal from effecting an escape. It will, of course, be understood that the traps may be made in different sizes and shapes and constructed of any suitable material without departing from the spirit of the invention.

Having thus described the invention, I claim:

1. An animal trap including a receptacle having an open end, a door for closing said open end, a brace secured to the receptacle and having a cut-away portion, a trigger secured to said brace and extending over said cut-away portion, said trigger being adapted to engage the door and hold the latter normally in open position, a depressible treadle disposed within the receptacle, and means forming an operative connection between the treadle and trigger whereby when the treadle is depressed the trigger will be released to permit automatic closing of the door.

2. An animal trap including a receptacle having an open end, a door for closing said open end and provided with a tooth, a brace within the receptacle and having a portion thereof cutaway, a resilient trigger secured to the brace and extending over the cut-away portion thereof and engaging the tooth of the door for normally holding the door in open position, a depressible treadle, a flexible connection between the treadle and trigger for releasing the trigger to permit closing of the door, and means connected with the trigger for manually releasing said trigger.

3. An animal trap including a receptacle having an open end, a frame surrounding the open end of the receptacle, a reinforcing member disposed within the frame, a plate secured to the reinforcing member, a door pivotally connected with the plate and provided with a guide, a spring having one end thereof secured to the receptacle and its other end slidably mounted in the guide, a trigger engaging the door for normally holding the door in open position, a depressible member disposed within the receptacle, and an operative connection between the depressible member and trigger whereby the weight of an animal on the depressible member will release the trigger and permit closing of the door.

4. An animal trap including a receptacle having an open end, a frame surrounding the open end of the receptacle, a reinforcing member disposed within the frame and having a ledge, a wedge-shaped member secured to the bottom of the receptacle beneath said ledge, a plate secured to the ledge, a door pivotally connected with the plate, a spring forming a connection between the door and receptacle, a transverse brace disposed within the receptacle, the lower end of the door being provided with teeth, one of which is longer than the others, a trigger secured to the brace and adapted to engage the long tooth of the door for holding the door normally in open position, a depressible member arranged within the receptacle, and a flexible connection between the depressible member and trigger whereby the weight of an animal on the depressible member will release the trigger and permit closing of the door.

5. An animal trap including a receptacle having an open end, a spring-actuated door normally closing the open end of the receptacle, a conduit secured to the exterior of the receptacle, a trigger mounted within the receptacle and adapted to engage the door for holding the door normally in open position, a depressible treadle arranged within the receptacle, a flexible connection having one end thereof connected to the treadle and its other end extended through the conduit and engaging the trigger whereby the weight of an animal on the treadle will depress the same and release the trigger to permit closing of the door and manually operable means for releasing the trigger independently of the treadle.

6. An animal trap including a receptacle having an open end, a door for closing said open end, a depressible treadle disposed within the receptacle and including mating sections, a pin forming a pivotal connection between said sections and having an upturned end, a conduit disposed on the outside of the receptacle, a trigger adapted to engage and hold the door in an open position, and a flexible cable forming a connection between the upturned end of the pin and the adjacent end of the trigger for releasing the latter when said treadle is depressed by the weight of an animal thereon.

7. An animal trap including a receptacle having an open end, a pivoted door for closing said open end and having its free end serrated to form teeth, one of which is longer than the others, means for anchoring the trap on a suitable support, a trigger disposed within the receptacle and adapted to engage the long tooth of the door, a conduit, a depressible treadle arranged within the receptacle, a flexible cable having one end thereof operatively connected with the treadle and its other end with the trigger, and a rod connected with one end of the trigger and provided with a finger piece whereby the trigger may be released from engagement with the door.

8. An animal trap including a receptacle having its opposite ends open, inwardly swinging pivotally mounted doors forming closures for the opposite ends of the receptacle, a trigger coacting with each door for normally holding the doors in open position, a treadle disposed within the trap between the doors, flexible cables connected with the treadle and said triggers for releasing the triggers to permit closing of the doors when the treadle is depressed and manually operable means for releasing the triggers independently of the treadle.

9. An animal trap including a receptacle having its opposite ends open, inwardly swinging pivotally mounted doors forming closures for the opposite ends of the receptacle, a treadle arranged within the receptacle and including coacting sections, springs slidably mounted on the bottom of the receptacle and secured to the sections with the ends of the springs bent to form eyes, a rod extending through said eyes and having its opposite ends provided with upstanding terminals, conduits extending longitudinally of the receptacle, triggers coacting with the doors, and flexible cables each having one end thereof secured to the adjacent upstanding terminal and the other end thereof secured to the adjacent trigger, and manually operable releasing means for each trigger.

10. An animal trap including a receptacle having an open end, an inwardly swinging door pivotally mounted at the open end of the receptacle, a spring forming a connection between the receptacle and door, the lower end of said door being scalloped to form teeth, a wedge-shaped member secured to the bottom of the receptacle and coacting with the teeth of the door to prevent escape of an animal from the trap, and spurs secured to the inclined surface of said member and projecting upwardly within the trap in advance of the door.

EDWIN M. LONG.